US011958187B2

(12) United States Patent
Azuma et al.

(10) Patent No.: US 11,958,187 B2
(45) Date of Patent: Apr. 16, 2024

(54) ROBOT HAND, ROBOT AND ROBOT SYSTEM

(71) Applicant: Kawasaki Jukogyo Kabushiki Kaisha, Kobe (JP)

(72) Inventors: Kentaro Azuma, Kobe (JP); Takayuki Ishizaki, Kakogawa (JP); Mitsunobu Oka, Kobe (JP); Masataka Yoshida, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 556 days.

(21) Appl. No.: 17/180,879

(22) Filed: Feb. 22, 2021

(65) Prior Publication Data

US 2021/0187727 A1    Jun. 24, 2021

Related U.S. Application Data

(63) Continuation of application No. PCT/JP2019/032330, filed on Aug. 19, 2019.

(30) Foreign Application Priority Data

Aug. 23, 2018   (JP) ................................ 2018-156231

(51) Int. Cl.
*B25J 9/00* (2006.01)
*B25J 5/00* (2006.01)
(Continued)

(52) U.S. Cl.
CPC ............. *B25J 9/0093* (2013.01); *B25J 5/007* (2013.01); *B25J 15/0616* (2013.01); *B25J 17/025* (2013.01)

(58) Field of Classification Search
CPC ...... B25J 9/0093; B25J 5/007; B25J 15/0616; B25J 17/025; B25J 15/0014; B25J 9/0033;
(Continued)

(56) References Cited

U.S. PATENT DOCUMENTS 9,498,887 B1 * 11/2016 Zevenbergen ....... B25J 15/0616
9,519,882 B2 * 12/2016 Galluzzo .............. G05D 1/0088
(Continued)

FOREIGN PATENT DOCUMENTS

JP    61-282226 A    12/1986
JP    2001-62762 A    3/2001
(Continued)

*Primary Examiner* — Victor L Macarthur
(74) *Attorney, Agent, or Firm* — XSENSUS LLP (57) ABSTRACT

A robot includes a base attached to an end of a robotic arm, a conveyor fixed to the base, and a holder to hold a workpiece and place the workpiece on a transferring surface of the conveyor. The holder includes a pivot shaft extending along the conveyor in a transferring direction of the conveyor, and reciprocatable or telescopic in the transferring direction, a pivoting structure attached to the pivot shaft so as to be reciprocatable in the transferring direction, and pivotable centering on the pivot shaft in a plane in which a width direction perpendicular to the transferring direction intersects with a height direction perpendicular to the transferring direction and the width direction, and a holding structure upstream of the pivoting part in the transferring direction to hold the workpiece.

19 Claims, 4 Drawing Sheets

(51) Int. Cl.
*B25J 15/06* (2006.01)
*B25J 17/02* (2006.01)

(58) Field of Classification Search
CPC ........ B65G 47/91; B65G 61/00; B65G 47/90; B65G 41/005; B65G 47/914; B65G 2201/02
See application file for complete search history.

(56) References Cited

U.S. PATENT DOCUMENTS

| | | |
|---|---|---|
| 10,351,362 B2 | 7/2019 | Tanaka et al. |
| 2017/0107058 A1 | 4/2017 | Nakamoto et al. |

FOREIGN PATENT DOCUMENTS

| | | | |
|---|---|---|---|
| JP | 2016-55995 A | 4/2016 | |
| JP | 2016-94280 A | 5/2016 | |
| JP | 2018-39534 A | 3/2018 | |
| WO | WO-2016033172 A1 * | 3/2016 | .............. B25J 11/00 |

\* cited by examiner

ROBOT HAND, ROBOT AND ROBOT SYSTEM

CROSS-REFERENCES TO RELATED APPLICATIONS

The present application claims priority to PCT/JP2019/032330 filed Aug. 19, 2019, which claims priority to JP 2018-156231 filed Aug. 23, 2018, the entire contents of each are incorporated herein by reference.

TECHNICAL FIELD

The present disclosure relates to a robot hand, a robot, and a robot system.

BACKGROUND ART

A load handling device is provided with a movable conveyor and a take-out arm. The movable conveyor advances so as to approach a load, and a gripping part provided at an end of the take-out arm grips the load. After the take-out arm places the load on the movable conveyor, it changes its posture to a load-avoiding posture. Then, the movable conveyor descends to the height of a conveying bench, and a belt constituting a transferring surface of the conveyor rotates so as to place the load onto the conveying bench.

DESCRIPTION OF THE DISCLOSURE

Summary of the Disclosure

A robot hand according to one aspect of the present disclosure includes a base attached to an end of a robotic arm, a conveyor fixed to the base, and a holder to hold a workpiece and place the workpiece on a transferring surface of the conveyor.

The holder may include a pivot shaft extending along the conveyor in a transferring direction of the conveyor, and reciprocatable or telescopic in the transferring direction, a pivoting structure attached to the pivot shaft so as to be reciprocatable in the transferring direction, and pivotable centering on the pivot shaft in a plane in which a width direction perpendicular to the transferring direction intersects with a height direction perpendicular to the transferring direction and the width direction, and a holding structure upstream of the pivoting structure in the transferring direction to hold the workpiece.

BRIEF DESCRIPTION OF DRAWINGS

FIGS. 3(A) and 3(B) are side views of a robot according to the embodiment of the present disclosure, where FIG. 3(A) is a view when a pivoting part is advanced, and FIG. 3(B) is a view when the pivoting part is retreated.

FIGS. 4(A) and 4(B) are front views of a robot hand according to the embodiment of the present disclosure, where FIG. 4(A) is a view when the pivoting part is in a workpiece-holding posture, and FIG. 4(B) is a view when the pivoting part is in a workpiece-avoiding posture.

MODE FOR CARRYING OUT THE DISCLOSURE

Hereinafter, a robot hand, a robot, and a robot system according to one embodiment of the present disclosure are described with reference to the accompanying drawings. Note that the present disclosure is not limited to this embodiment. Moreover, below, the same reference characters are given to the same or corresponding components throughout the drawings to omit redundant description.

Robot System 10

Figure 1:
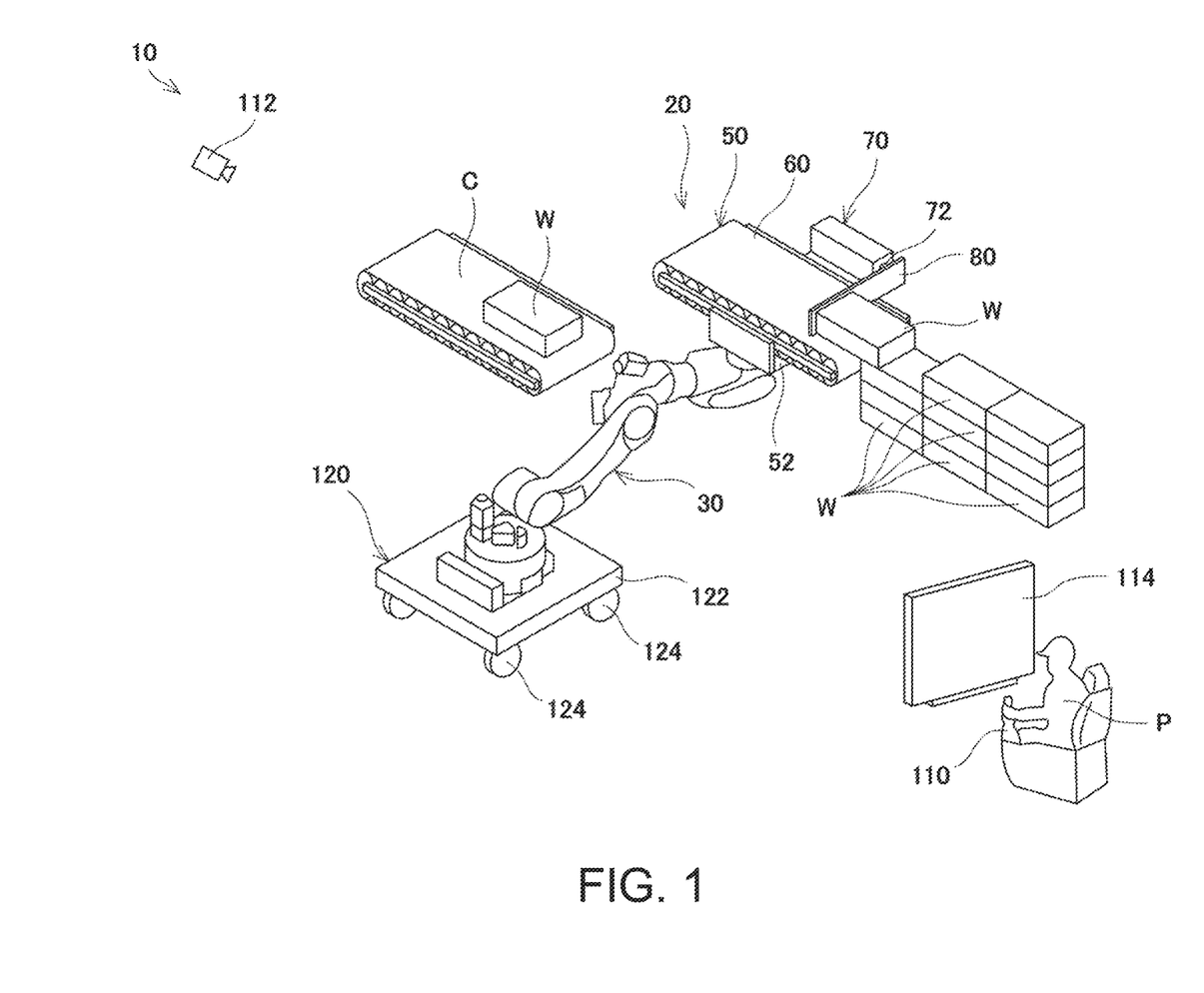
FIG. 1 is a schematic view illustrating a state in which a robot system according to one embodiment of the present disclosure is used to transfer a cardboard box.
Figure 2:
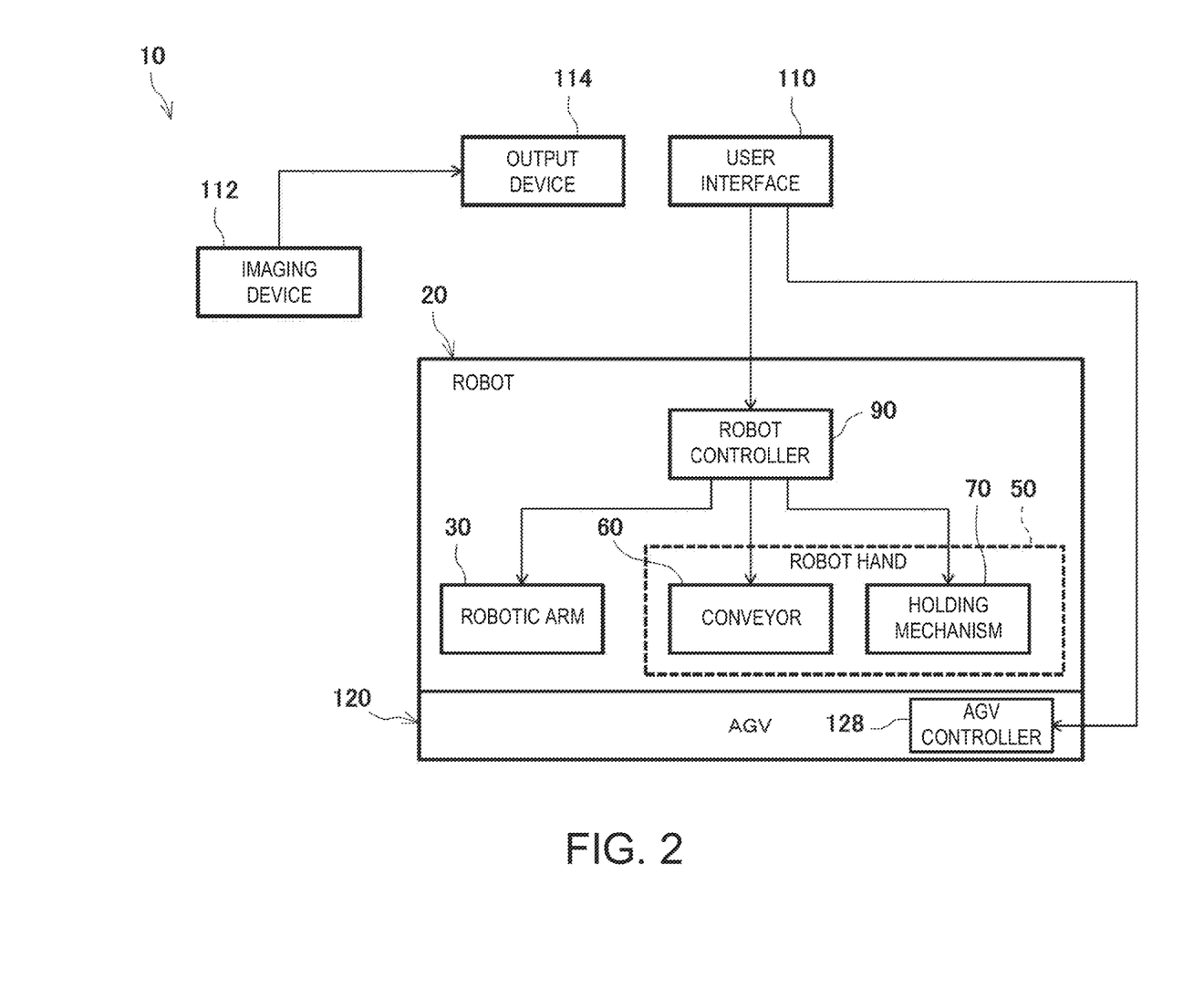
FIG. 2 is a block diagram illustrating the entire configuration of the robot system according to the embodiment of the present disclosure.

FIG. 1 is a schematic view illustrating a state in which a robot system according to this embodiment is used to transfer a cardboard box. FIG. 2 is a block diagram illustrating the entire configuration of the robot system. As illustrated in FIG. 1, a robot system 10 according to this embodiment transfers a cardboard box W (a workpiece) which is sealed while packing an object therein. In detail, the robot system 10 transfers a plurality of piled cardboard boxes W one by one to a stationary-type conveyor C.

As illustrated in FIGS. 1 and 2, the robot system 10 is provided with a robot 20, and a user interface 110 which remotely operates the robot 20. The robot system 10 further includes an imaging device 112 which images a working state of the robot 20, and an output device 114 which outputs the imaged information of the imaging device 112. The robot system 10 is further provided with an AGV (Automated Guided Vehicle) 120 to which a base end of a robotic arm 30 is fixed.

Robot 20

As illustrated in FIGS. 1 and 2, the robot 20 is provided with the robotic arm 30, a robot hand 50 attached to an end of the robotic arm 30, and a robot controller 90 which controls operations of the robotic arm 30 and the robot hand 50. The robot 20 is a vertically articulated robot.

Robotic Arm 30

Figure 3A:
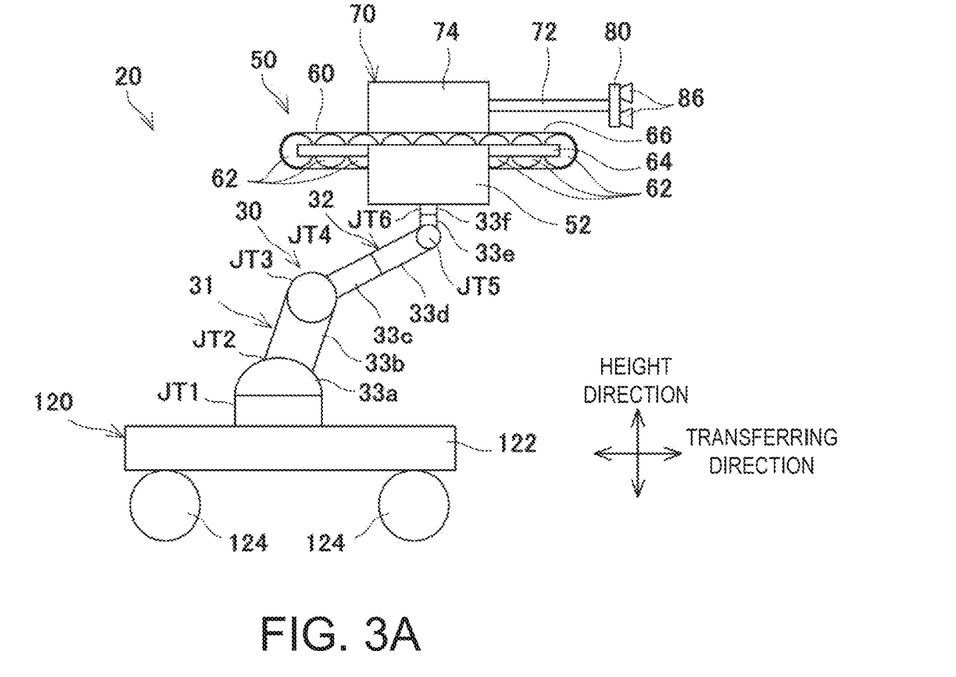
Figure 3B:
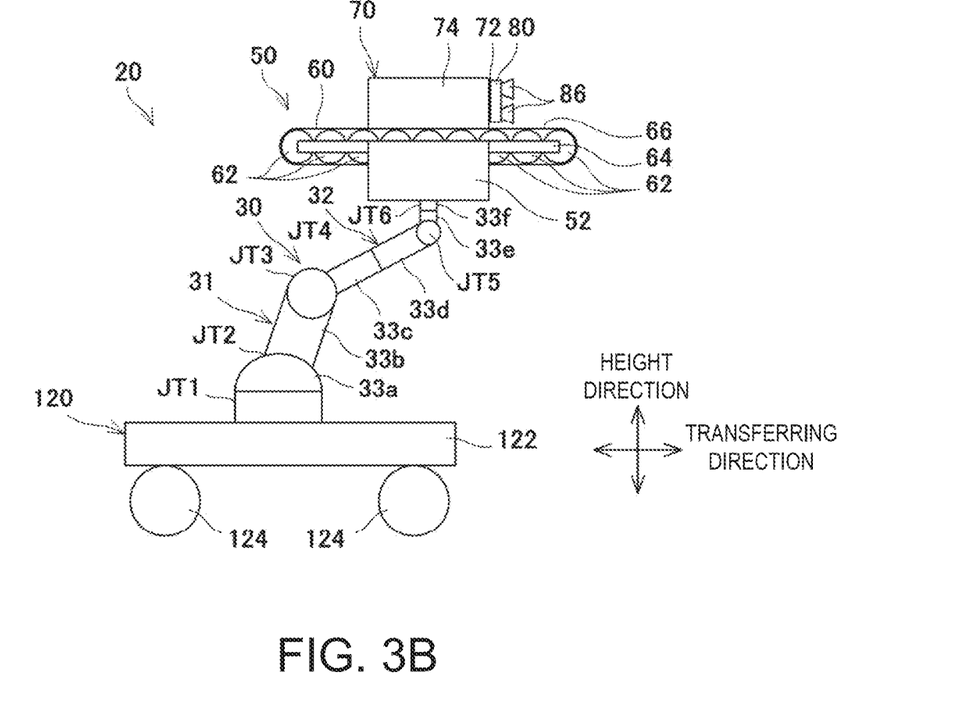

FIGS. 3(A) and 3(B) are side views of the robot according to this embodiment. FIG. 3(A) is a view when a pivoting part is advanced, and FIG. 3(B) is a view when the pivoting part is retreated. As illustrated in FIGS. 3(A) and 3(B), the robotic arm 30 is an articulated arm having six joint axes (shafts) JT1-JT6, and six links 33a-33f serially coupled to each other via the corresponding joint axes.

A coupled structure of the links and the joint axes, comprised of the first joint axis JT1, the first link 33a, the second joint axis JT2, the second link 33b, the third joint axis JT3, and the third link 33c, constitutes a first arm part 31. In detail, the first joint axis JT1 couples an upper surface of the AGV 120 to a base-end part of the first link 33a so as to be rotatable about a vertical axis. The second joint axis JT2 couples an end part of the first link 33a to a base-end part of the second link 33b so as to be rotatable about a horizontal axis. The third joint axis JT3 couples an end part of the second link 33b to a base-end part of the third link 33c so as to be rotatable about a horizontal axis.

A coupled structure of the links and the joint axes, comprised of the fourth joint axis JT4, the fourth link 33d, the fifth joint axis JT5, the fifth link 33e, the sixth joint axis JT6, and the sixth link 33f, constitutes a second arm part 32. In detail, the fourth joint axis JT4 couples an end part of the third link 33c to a base-end part of the fourth link 33d so as to be rotatable about an axis extending in a longitudinal direction of the third link 33c. The fifth joint axis JT5 couples an end part of the fourth link 33d to a base-end part of the fifth link 33e so as to be rotatable about an axis extending perpendicularly to a longitudinal direction of the fourth link 33d. The sixth joint axis JT6 couples an end part of the fifth link 33e to a base-end part of the sixth link 33f so as to be rotatable in a twisted manner. Then, the robot hand 50 is attached to an end part of the sixth link 33f.

Robot Hand 50

Figure 4A:
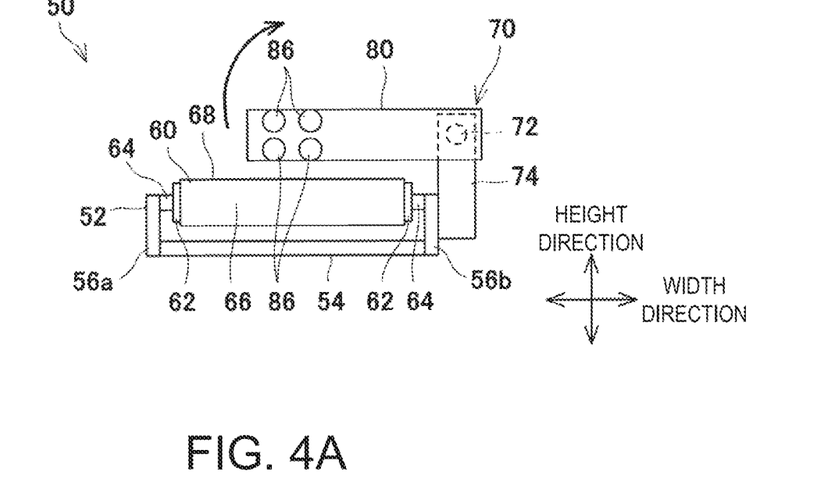
Figure 4B:
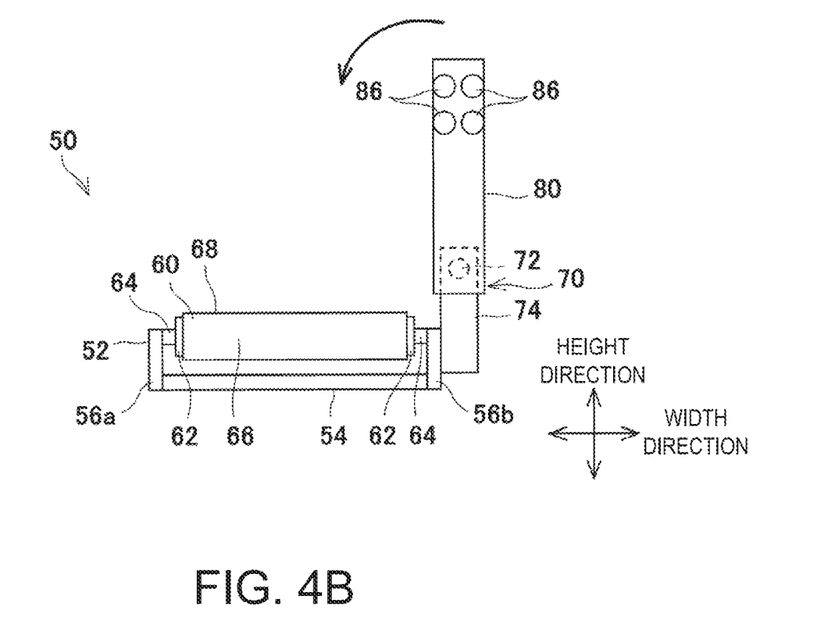

FIGS. 4(A) and 4(B) are front views of the robot hand according to this embodiment. FIG. 4(A) is a view when the pivoting part is in a workpiece-holding posture, and FIG. 4(B) is a view when the pivoting part is in a workpiece-avoiding posture. As illustrated in FIGS. 3(A), 3(B), 4(A) and 4(B), the robot hand 50 is provided with a base 52 attached to the end of the robotic arm 30, a conveyor 60 fixed to the base 52, and a holding mechanism 70 which holds the cardboard box W and places it on a transferring surface 68 of the conveyor 60.

Base 52

As illustrated in FIGS. 3(A), 3(B), 4(A) and 4(B), the base 52 has a bottom plate 54 in a rectangular shape when seen in its thickness direction, a side plate 56a standing from one end edge of the bottom plate 54 in its width direction, and a side plate 56b standing from the other end edge of the bottom plate 54. Each of the side plates 56a and 56b has a rectangular shape when seen in its thickness direction, and has the same shape as each other.

Conveyor 60

As illustrated in FIGS. 3(A) and 3(B), the conveyor 60 is a belt conveyor. The conveyor 60 includes a plurality of rollers 62 disposed in parallel to each other in a transferring direction, a pair of shafts 64a and 64b which support rotational shafts of the plurality of rollers 62, a ring-shaped transferring belt 66 wound around the plurality of rollers 62, and an electric motor which rotary drives at least one of the plurality of rollers 62.

Holding Mechanism 70

As illustrated in FIGS. 3(A), 3(B), 4(A) and 4(B), the holding mechanism or holder 70 has a pivot shaft 72 extending in the transferring direction of the conveyor 60 along the conveyor 60, a pivoting part 80 attached to the pivot shaft 72, and four suction parts 86 (a holding part) provided upstream of the pivoting part 80 in the transferring direction (i.e., the transferring direction of the conveyor 60) so as to suck and hold the cardboard box W.

As illustrated in FIGS. 3(A) and 3(B), the pivot shaft 72 is provided along an edge part of the conveyor 60 in the width direction, and is expandable and contractible in the transferring direction. In detail, the pivot shaft 72 is configured as a piston which projects toward upstream in the transferring direction from inside a cylinder 74 in a rectangular-parallelepiped shape. The cylinder 74 is provided along the edge part of the conveyor 60 in the width direction. That is, although, in appearance of the robot 20, a part of the pivot shaft 72 projecting from the cylinder 74 toward upstream in the transferring direction (i.e., a visible part from outside) is telescopic in the transferring direction, the pivot shaft 72 is actually reciprocatable in the transferring direction.

The pivoting part 80 is formed in a plate-like shape, and is attached to the pivot shaft 72 so that a thickness direction of the pivoting part 80 corresponds to the transferring direction. In detail, the pivoting part 80 is attached to the end of the pivot shaft 72 at a base-end part of a principal surface of the pivoting part 80 located downstream in the transferring direction. Both principal surfaces of the pivoting part 80 have longitudinal dimensions.

As illustrated in FIGS. 3(A) and 3(B), the pivoting part 80 is reciprocatable in the transferring direction by being attached to the pivot shaft 72. In detail, the pivoting part 80 is reciprocatable in the transferring direction between a position further upstream of an upstream end of the conveyor 60 and an intermediate part of the conveyor 60 in the transferring direction.

As illustrated in FIGS. 4(A) and 4(B), by the pivoting part 80 being attached to the pivot shaft 72, it is pivotable in a plane in which the width direction perpendicular to the transferring direction intersects with a height direction perpendicular to the transferring direction and the width direction. In detail, the pivoting part 80 is pivotable centering on the pivot shaft 72 within a range from a workpiece-transferring posture where the pivoting part 80 extends in the width direction of the conveyor 60, to the workpiece-avoiding posture where it extends in the height direction of the conveyor 60 (i.e., within the rotational angle of 90°).

As illustrated in FIGS. 3(A), 3(B), 4(A) and 4(B), each of the four suction parts 86 is formed in a hollow tapered shape, and the tapered end is attached to the pivoting part 80. In detail, as illustrated in FIGS. 4(A) and 4(B), the four suction parts 86 are arranged to be 2×2 in row and column, and attached to the upstream principal surface of the pivoting part 80 in the transferring direction. The four suction parts 86 are each connected to a vacuum generator, and thus, the pressure inside the suction part 86 becomes negative. The four suction parts 86 suck a side surface of the cardboard box W by the negative pressure so as to cooperatively hold one cardboard box W.

Robot Controller 90

As illustrated in FIG. 2, the robot controller 90 controls the operations of the robotic arm 30, the conveyor 60, and the holding mechanism 70 according to operational information from the user interface 110 based on a program stored in advance in a storage device. A concrete configuration of the robot controller 90 is not particularly limited, and it may be implemented, for example, by a known processor (e.g., a CPU) operating based on the program stored in the storage device (e.g., a memory).

User Interface 110

As illustrated in FIG. 1, the user interface 110 is disposed to be separated from the robot 20 and the AGV 120 by given distances in order to remotely operate the robot 20 and the AGV 120 based on a command value manually inputted by an operator P.

A concrete configuration of the user interface 110 is not particularly limited, and it may accept a displacement of a control handle or pressing of a button as the command value, or the user interface 110 may be configured as a touch-panel screen which accepts pressing or touching of a screen display as the command value. Alternatively, the user interface 110 may accept voice as the command value using a microphone, or may have other configurations.

The user interface 110 generates the operational information by accepting the command value manually inputted by the operator P, and transmits the operational information to the robot controller 90 and an AGV controller 128.

Imaging Device 112

The imaging device 112 is provided in order to image the working state of the robot 20 and the AGV 120 so as to acquire video information. A concrete configuration of the imaging device 112 is not particularly limited, and it may be configured as any type of known or desired video camera.

Output Device 114

The output device 114 is a displaying device which outputs the video information captured by the imaging device 112. A concrete configuration of the output device 114 is not particularly limited, and it may be a Liquid Crystal Display, an Organic Electro-Luminescence Display, or other devices.

AGV 120

The AGV (Automated Guided Vehicle) 120 has a vehicle body 122 formed in a plate-like shape and to which the base end of the robotic arm 30 is fixed on its upper surface, a plurality of wheels 124 attached to a bottom surface of the vehicle body 122, and the AGV controller 128 which controls the operation of the AGV 120.

The AGV controller 128 controls the operation of the AGV 120 according to, for example, the operational information from the user interface 110 based on a program stored in advance in a storage device. A concrete configuration of the AGV controller 128 is not particularly limited, and it may be implemented by a known processor (e.g., a CPU) operating based on the program stored in the storage device (e.g., a memory).

Note that the AGV controller 128 may detect weak induced current from electric wiring buried underground of a work site, and control the operation of the AGV 120 based on the detected value. In this case, the operational information may be received from the user interface 110 as needed.

EXAMPLE OF TRANSFERRING WORK

One example of the transferring work executed by the robot system 10 according to this embodiment is described. Here, the robot system 10 is used to transfer the plurality of piled cardboard boxes W one by one to the stationary-type conveyor C. Note that, in the following example of the transferring work, the operator P may input the command value to the user interface 110 while grasping the working state of the robot 20 and the AGV 120 based on the video information outputted through the output device 114. Here, the video information outputted from the output device 114 is images of the working state of the robot 20 and the AGV 120 captured by the imaging device 112.

First, the operator P operates the user interface 110 to stop the transferring belt 66 of the conveyor 60. Moreover, as illustrated in FIG. 3(A), the pivot shaft 72 is extended so that the pivoting part 80 is located further upstream of the upstream end of the conveyor 60. Moreover, as illustrated in FIG. 4(A), the operator P operates the user interface 110 to rotate the pivot shaft 72 so that the pivoting part 80 is pivoted to take the workpiece-holding posture.

Next, the operator P operates the user interface 110 to manipulate the AGV 120 so that the robot 20 (and the AGV 120) approaches the plurality of piled cardboard boxes W to be transferred.

Moreover, the operator P operates the user interface 110 to change the posture of the robotic arm 30 so that the four suction parts 86 provided on the upstream principal surface of the pivoting part 80 contact a side surface of one of the cardboard boxes W, which is located at the top of the plurality of cardboard boxes W (hereinafter, simply referred to as a "top cardboard box W"). At this time, the operator P operates the user interface 110 to adjust the posture of the robotic arm 30 so that an upstream end of the transferring surface of the conveyor 60 extends in parallel to a lower end edge of the side surface of the top cardboard box W, near and below the lower end edge.

Then, the operator P operates the user interface 110 to drive the vacuum generator so as to make inside the four suction parts 86 negative pressure. Therefore, the suction parts 86 suck the side surface of the top cardboard box W to hold it.

Next, as illustrated in FIG. 3(B), the operator P operates the user interface 110 to contract the pivot shaft 72 so that the pivoting part 80 pivots to the intermediate position of the conveyor 60 in the transferring direction. Therefore, the cardboard box W held by the suction parts 86 is pulled and placed on the transferring surface 68.

Moreover, the operator P operates the user interface 110 to change the posture of the robotic arm 30 so that the transferring surface 68 of the conveyor 60 continues to upstream of a transferring surface of the stationary-type conveyor C. At this time, the posture of the robotic arm 30 is adjusted so that a downstream end edge of the transferring surface of the conveyor 60 approaches above an upstream-end part of the transferring surface of the stationary-type conveyor C, and width directions of both transferring surfaces become parallel to each other.

When the distance between the plurality of piled cardboard boxes W and the stationary-type conveyor C is larger than a movable range of the end of the robotic arm 30, the operator P may operate the user interface 110 to move the AGV 120 in addition to changing the posture of the robotic arm 30.

Moreover, the operator P operates the user interface 110 to stop the vacuum generator so as to release the top cardboard box W from the state sucked by the suction parts 86.

Then, as illustrated in FIG. 4(B), the operator P operates the user interface 110 to rotate the pivot shaft 72 so that the pivoting part 80 is pivoted to take the workpiece-avoiding posture.

Finally, the operator P operates the user interface 110 to drive the transferring belt 66 of the conveyor 60. Accordingly, the cardboard box W placed on the transferring surface 68 of the conveyor 60 is moved downstream on the transferring surface 68, and is transferred from a downstream end of the transferring surface 68 to the upstream-end part of the transferring surface of the stationary-type conveyor C.

By repeating the transferring work described above, the robot system 10 can transfer all of the plurality of piled cardboard boxes W to the transferring surface of the stationary-type conveyor C. Note that the stationary-type conveyor C may be a belt conveyor similarly to the conveyor 60.

The belt conveyor may have a known structure. When the stationary-type conveyor C receives the cardboard box W from the conveyor 60 at its upstream part, it further transfers the cardboard box W to a desired destination.

The functionality of the elements including CPUs disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Effects

According to the robot hand 50 of this embodiment, since the conveyor 60 is fixed to the end of the robotic arm 30, the conveyor 60 can be moved within the movable range of the end of the robotic arm 30. As a result, the robot hand 50 capable of transferring the cardboard box W (the workpiece) by the movable conveyor 60 while the installing location will not be limited, can be provided.

According to the robot hand 50 of this embodiment, since the pivoting part 80 is reciprocatable in the transferring direction of the conveyor 60, the suction parts 86 provided to the pivoting part 80 can pull and place the cardboard box W onto the transferring surface 68 of the conveyor 69 while holding the cardboard box W. Moreover, since the pivoting part 80 is pivotable centering on the pivot shaft 72 in the plane in which the width direction of the conveyor 60 intersects with the height direction, the pivoting part 80 can pivot to take the workpiece-avoiding posture after the cardboard box W is placed on the transferring surface 68 of the conveyor 60 (i.e., the pivoting part 80 can pivot to the position where it does not hinder the transference of the cardboard box W on the conveyor 60). Therefore, the holding mechanism 70 with a simple configuration can hold the cardboard box W and place it on the transferring surface 68 of the conveyor 60.

In this embodiment, the pivoting part 80 has a plate-like shape and is attached to the pivot shaft 72 so that the thickness direction of the pivoting part 80 corresponds to the transferring direction of the conveyor 60. Moreover, the suction parts 86 are attached to the upstream principal surface of the pivoting part 80 in the transferring direction. Therefore, the configuration of the holding mechanism 70 can be further simplified.

In this embodiment, the pivot shaft 72 is provided along the edge part of the conveyor 60 in the width direction. Therefore, the entire structure of the robot hand 50 can be downsized. Moreover, the pivoting part 80 can easily take the workpiece-avoiding posture by pivoting after the cardboard box W is placed on the transferring surface 68 of the conveyor 60.

In this embodiment, the holding part is configured as the suction parts 86. Therefore, for example, even when holding one cardboard box W from the plurality of cardboard boxes W piled up without gaps therebetween, a side surface of the one cardboard box W can be sucked so that the one cardboard box W is easily held without interference of the other cardboard boxes W.

Since the robot 20 according to this embodiment has the robot hand 50 as described above, effects similar to the robot hand 50 can be achieved.

Since the robot 20 according to this embodiment is the vertically articulated robot, the robotic arm 30 can easily take a desired posture. As a result, the effects achieved by the present disclosure can be remarkable.

Since the robot 20 according to this embodiment has the six joint axes, the robotic arm 30 can easily take a desired posture. As a result, the effects achieved by the present disclosure can be remarkable.

The robot system 10 according to this embodiment uses the user interface 110 to remotely operate the robot 20 having the robot hand 50 and the robotic arm 30. As a result, the robot system 10 capable of transferring the cardboard box W by the movable conveyor while the installing location will further be unlimited, can be provided.

The robot system 10 according to this embodiment is further provided with the imaging device 112 which images the working state of the robot 20, and the output device 114 which outputs the video information captured by the imaging device 112. Therefore, the operator P can input the command value to the user interface 110 while accurately grasping the working state of the robot 20 based on the video information outputted from the output device 114.

The robot system 10 according to this embodiment is further provided with the AGV (Automated Guided Vehicle) 120 to which the base end of the robotic arm 30 is fixed. Therefore, even when the distance between the plurality of piled cardboard boxes W and the stationary-type conveyor C is larger than the movable range of the end of the robotic arm 30, the transferring work can be smoothly performed. That is, since the installing location will further be unlimited, the effects achieved by the present disclosure can be remarkable.

MODIFICATIONS

It is apparent for a person skilled in the art that many improvements and other embodiments of the present disclosure are possible from the above description. Therefore, the above description is to be interpreted only as illustration, and it is provided in order to teach a person skilled in the art the best mode for implementing the present disclosure. The details of the structures and/or the functions may be substantially changed, without departing from the spirit of the present disclosure.

Although in the embodiment described above the transferred workpiece is the cardboard box W, it is not limited to this. The workpiece may be another object having a given shape (e.g., a member used for assembling machinery, and packed food), or an object not having a fixed shape, such as a rock and a fried chicken.

In the embodiment described above, the transferring belt 66 of the conveyor 60 is started to drive after the cardboard box W is placed on the transferring surface 68 of the conveyor 60, the posture of the robotic arm 30 is changed so that the transferring surface 68 of the conveyor 60 continues to upstream of the transferring surface of the stationary-type conveyor C, and the pivoting part 80 is changed to the workpiece-avoiding posture. However, it is not limited to this configuration, and the transferring work may be performed while the transferring belt 66 of the conveyor 60 is always driven. Accordingly, the plurality of cardboard boxes W can be transferred one by one in a shorter period of time.

In the embodiment described above, as illustrated in the block diagram of FIG. 2, the robot system 10 is provided with the robot 20, the user interface 110, the imaging device 112, the output device 114 and the AGV 120. However, it is not limited to this, and the robot system 10 may further include other configurations. For example, the robot system 10 may further include the stationary-type conveyor C, which is the transferring destination of the cardboard box W in the embodiment described above. In this case, for example, the operator P may operate the user interface 110 to control the operation of the stationary-type conveyor C.

Although in the embodiment described above the position of the conveyor 60 is changed only by changing the posture of the robotic arm 30 and moving the AGV 120, it is not limited to this. For example, the conveyor 60 may be attached to the base 52 so as to be rotatable with respect to the base 52 in a plane in which the transferring direction intersects with the height direction of the conveyor 60. Alternatively, the base 52 may be provided with a pair of rails, and the conveyor 60 may be attached to the base 52 so as to be movable along the rails. Note that in this case the robot controller 90 may further control the operation of the base 52.

Although in the embodiment described above the holding part is comprised of the four suction parts 86 which suck and hold the cardboard box W (the workpiece), it is not limited to this. For example, the number of the suction parts 86 may be one or more and three or less, or five or more. Moreover, the shape of each of the four suction parts 86 is not limited to the hollow tapered shape, but may be a hollow rectangular parallelepiped shape or a hollow cylindrical shape, or other shapes. Furthermore, the holding part may be a gripping part which grips the workpiece to hold it, a placing part which places the workpiece thereon to hold it, or other configurations.

Although in the embodiment described above the conveyor 60 is the belt conveyor, it is not limited to this. For example, the conveyor 60 may be a roller conveyor, or other types of conveyor.

In the embodiment described above, the pivot shaft 72 is telescopic in appearance of the robot 20 in the transferring direction of the conveyor 60 while it is actually reciprocatable in the transferring direction using the cylinder 74. However, it is not limited to this configuration. For example, the pivot shaft 72 may be comprised of a hollow cylindrical member and a cylindrical member coaxially inserted into the hollow cylindrical member so as to be reciprocatable in the axial direction, thus being telescopic in the transferring direction of the conveyor 60. In this case, a part of the cylindrical member may project from an end of the hollow cylindrical member when the axial shaft 72 contracts to the most, and the pivoting part 80 may be attached to the projecting part. Alternatively, the pivot shaft 72 may be reciprocatable also in appearance of the robot 20 in the transferring direction of the conveyor 60 without using the cylinder 74 (e.g., by being coupled to another member reciprocatable in the transferring direction of the conveyor 60).

Although in the embodiment described above the pivot shaft 72 is provided along the edge part of the conveyor 60 in the width direction, it is not limited to this. For example, the pivot shaft 72 may be disposed above the conveyor 60 so as to extend in parallel to the transferring surface 68 of the conveyor 60 when seen in the width direction of the conveyor 60, and extend in the transferring direction along the centerline of the conveyor 60 in the width direction when seen in the height direction from above the conveyor 60. In this case, the pivoting part 80 may be attached at its base-end part to the pivot shaft 72 so as to be pivotable centering on the pivot shaft 72 in the plane in which the width direction intersects with the height direction. For example, the pivoting part 80 may be pivotable within a range from a workpiece-avoiding posture in which the pivoting part 80 extends toward one side of the conveyor 60 in the width direction, to a workpiece-transferring posture in which it extends in the height direction of the conveyor 60, and then, to a workpiece-avoiding posture in which it extends toward the other side of the conveyor 60 in the width direction (i.e., within the rotational angle of 180° in the plane).

Although in the embodiment described above the robot 20 is the vertically articulated robot, it is not limited to this. For example, the robot 20 may be a polar robot, a cylindrical robot, a Cartesian coordinate robot, a horizontally articulated robot, or other types of robot.

Although in the embodiment described above the robotic arm 30 has the six joint axes, it is not limited to this. For example, the robotic arm 30 may have seven or more joint axes. Alternatively, the robotic arm 30 may have one or more and five or less joint axes.

Although in the embodiment described above the robot system 10 is provided with the imaging device 112 and the output device 114, it is not limited to this. For example, the robot system 10 may not be provided with the imaging device 112 and the output device 114, but the operator P may visually confirm the working state of the robot 20 and the AGV 120. Accordingly, the configuration of the robot system 10 can be further simplified.

Although in the embodiment described above the pivoting part 80 is formed to be a plate-like shape having a rectangular shape when seen in the thickness direction and is attached to the pivot shaft 72 so that the thickness direction corresponds to the transferring direction of the conveyor 60, and the suction parts 86 are attached to the upstream principal surface of the pivoting part 80 in the transferring direction, it is not limited to this. For example, the pivoting part 80 may have any shape as long as it can pivot while being attached to the pivot shaft 72 so as to take the workpiece-holding posture and the workpiece-avoiding posture, and the suction parts 86 (the holding part) can be attached upstream of the pivoting part 80 in the transferring direction. For example, the pivoting part 80 may be formed in a plate-like shape having a triangular shape, a polygonal shape with more than five sides, or a square shape when seen in the thickness direction. Alternatively, the pivoting part 80 may be formed in a cylindrical shape, a pyramid shape, a cone shape, or other shapes.

Although in the embodiment described above the robot system 10 allows the operator P to input the command value using the user interface 110 so as to operate the robot 20 and the AGV 120 based on the command value, it is not limited to this. For example, the robot system 10 may be a fully automatic system without the user interface 110.

In order to implement the robot system 10 as the fully automatic system, the robotic arm 30 may be provided with a proximity sensor at its end, and the robot controller 90 may control the operations of the robotic arm 30 and the robot hand 50 based on a detection value of the proximity sensor, etc. Alternatively, the robotic arm 30 may be provided with a camera at its end, and the robot controller 90 may control the operations of the robotic arm 30 and the robot hand 50 based on an analytical value of the imaged information of the camera, etc. Moreover, weak induced current may be detected from electric wiring buried underground of the work site, and the AGV controller 128 may control the operation of the AGV 120 based on this detection value.

According to the disclosure, since the conveyor is fixed to the end of the robotic arm, the conveyor can be moved within a range where the end of the robotic arm is movable. Thus, the robot hand is capable of transferring the workpiece by the movable conveyor while not limiting an installing location.

According to the disclosure, since the pivoting part can reciprocate in the transferring direction of the conveyor, the holding part provided to the pivoting part can pull the workpiece to place it on the transferring surface of the conveyor while holding the workpiece. Moreover, since the pivoting part is pivotable centering on the pivot shaft in the plane in which the width direction of the conveyor intersects with the height direction, after the workpiece is placed on the transferring surface of the conveyor, the pivoting part can be pivoted to a position not interfering the transferring of the workpiece on the conveyor. As described above, the holding mechanism with a simple structure can hold the workpiece and place it on the transferring surface of the conveyor.

The pivoting part may be formed in a plate-like shape and attached to the pivot shaft so that a thickness direction of the pivoting part corresponds to the transferring direction. The holding part may be attached to a principal surface of the pivoting part located upstream in the transferring direction.

According to this structure, the holding mechanism can be further simplified.

The pivot shaft may be provided along an edge part of the conveyor in the width direction.

According to this structure, the entire structure of the robot hand can be reduced in size. Moreover, after the workpiece is placed on the transferring surface of the conveyor, the pivoting part can be easily pivoted to the position not interfering the transferring of the workpiece on the conveyor.

The holding part may be a suction part configured to suck and hold the workpiece.

According to this structure, even when, for example, holding one workpiece from a plurality of workpieces piled up without gaps therebetween, a side surface of the one workpiece can be sucked so that the one workpiece is easily held without interference of the other workpieces.

For example, the conveyor may be a belt conveyor.

According to this structure, by being provided with the robot hand, the conveyor can be moved within the range where the end of the robotic arm is movable. As a result, the robot capable of transferring the workpiece by the movable conveyor while the installing location will not be limited, can be provided.

The robot may be a vertically articulated robot.

According to this structure, the robotic arm can easily take a desired posture, and as a result, the effects achieved by the present disclosure can be remarkable.

The robotic arm may have six or more joint axes.

According to this structure, the robotic arm can easily take a desired posture, and as a result, the effects achieved by the present disclosure can be remarkable.

According to this structure, by being provided with the robot hand, the conveyor can be moved within the range where the end of the robotic arm is movable. As a result, the robot system capable of transferring the workpiece by the movable conveyor while the installing location will not be limited, can be provided.

The robot system may further include a user interface configured to remotely operate the robot.

According to this structure, the robot including the robot hand and the robotic arm can be remotely operated by using the user interface. As a result, the robot system capable of transferring the workpiece by the movable conveyor while the installing location will further be unlimited, can be provided.

The robot system may further include an imaging device configured to image a working state of the robot, and an output device configured to output the imaged information of the imaging device.

According to this structure, the operator can input a command value to the user interface while accurately grasping the working state of the robot based on the information outputted from the output device.

The robot system may further include an automated guided vehicle to which a base end of the robotic arm is fixed.

According to the present disclosure, a robot hand, a robot, and a robot system capable of transferring a workpiece by a movable conveyor while the installing location will not be limited, can be provided.

DESCRIPTION OF REFERENCE CHARACTERS

10 Robot System
20 Robot
30 Robotic Arm
31 First Arm Part
32 Second Arm Part
33 Link
50 Robot Hand
52 Base
54 Bottom Plate
56 Side Plate
60 Conveyor
62 Roller
64 Shaft
66 Transferring Belt
68 Transferring Surface
70 Holding Mechanism or Holder
72 Pivot Shaft
74 Cylinder
80 Pivoting Part
86 Suction Part
90 Robot Controller
110 User interface
112 Imaging Device
114 Output Device
120 AGV
122 Vehicle Body
124 Wheel
128 AGV Controller
JT Joint Axis
C Stationary-type Conveyor
P Operator
W Cardboard Box

What is claimed is:

1. A robot hand, comprising:
a base attached to an end of a robotic arm;
a conveyor fixed to the base; and
a holder to hold a workpiece and place the workpiece on a transferring surface of the conveyor, wherein the holder includes:

a pivot shaft extending along the conveyor in a transferring direction of the conveyor, and telescopic in the transferring direction of the conveyor; and a pivoting structure directly attached to the pivot shaft so as to be telescopic in the transferring direction of the conveyor, and pivotable centering on the pivot shaft in a plane in which a width direction of the conveyor that is perpendicular to the transferring direction intersects with a height direction of the conveyor that is perpendicular to the transferring direction and the width direction.

2. The robot hand of claim 1, wherein the holder also includes:

a holding structure upstream of the pivoting structure in the transferring direction to hold the workpiece.

3. The robot hand of claim 2, wherein the pivoting structure has a plate shape and is attached to the pivot shaft so that a thickness direction of the pivoting structure corresponds to the transferring direction, and wherein the holding structure is attached to a principal surface of the pivoting structure located upstream in the transferring direction.

4. The robot hand of claim 2, wherein the pivot shaft is provided along an edge of the conveyor in the width direction.

5. The robot hand of claim 2, wherein the holding structure is a suction structure to suck and hold the workpiece.

6. The robot hand of claim 1, wherein the conveyor is a belt conveyor.

7. A robot, comprising:

the robot hand of claim 1;

the robotic arm to which the robot hand is attached; and a robot controller configured to control operations of the robot hand and the robotic arm.

8. The robot of claim 7, wherein the robot is a vertically articulated robot.

9. The robot of claim 7, wherein the robotic arm has six or more joint axes.

10. A robot system comprising:

the robot of claim 7; and a user interface configured to remotely operate the robot.

11. The robot system of claim 10, further comprising:

an imaging device configured to image a working state of the robot; and an output device configured to output the imaged information of the imaging device.

12. The robot system of claim 10, further comprising an automated guided vehicle to which a base end of the robotic arm is fixed.

13. The robot hand of claim 1, wherein the holder is directly attached to the conveyor.

14. A robot hand, comprising:

a base attached to an end of a robotic arm;

a conveyor fixed to the base; and means for holding a workpiece and placing the workpiece on a transferring surface of the conveyor, wherein the means for holding includes:

a pivot shaft extending along the conveyor in a transferring direction of the conveyor, and telescopic in the transferring direction of the conveyor; and a pivoting structure directly attached to the pivot shaft so as to be telescopic in the transferring direction of the conveyor, and pivotable centering on the pivot shaft in a plane in which a width direction of the conveyor that is perpendicular to the transferring direction intersects with a height direction of the conveyor that is perpendicular to the transferring direction and the width direction.

15. The robot hand of claim 14, wherein the pivoting structure has a plate shape and is attached to the pivot shaft so that a thickness direction of the pivoting structure corresponds to the transferring direction, and wherein the means for holding is attached to a principal surface of the pivoting structure located upstream in the transferring direction.

16. The robot hand of claim 14, wherein the pivot shaft is provided along an edge of the conveyor in the width direction.

17. The robot hand of claim 14, wherein the means for holding is a suction structure to suck and hold the workpiece.

18. The robot hand of claim 14, wherein the conveyor is a belt conveyor.

19. A robot, comprising:

the robot hand of claim 14;

the robotic arm to which the robot hand is attached; and a robot control means for controlling operations of the robot hand and the robotic arm.

\* \* \* \* \*